United States Patent [19]

Binder

[11] Patent Number: 4,932,509
[45] Date of Patent: Jun. 12, 1990

[54] BLADE FOR LIQUID FRICTION COUPLINGS

[75] Inventor: Hubert Binder, Graz, Austria

[73] Assignee: Steyr-Daimler-Puch AG, Vienna, Austria

[21] Appl. No.: 336,760

[22] Filed: Apr. 12, 1989

[30] Foreign Application Priority Data

Apr. 27, 1988 [AT] Austria .................................. 1068/88

[51] Int. Cl.$^5$ ............................................ F16D 35/00
[52] U.S. Cl. ................................ 192/58 B; 192/58 C; 192/70.14; 192/107 R
[58] Field of Search ...................... 192/57, 58 A, 58 B, 192/58 C, 70.14, 107 R

[56] References Cited

U.S. PATENT DOCUMENTS

| 1,928,301 | 9/1933 | Pierson | 192/58 C |
|---|---|---|---|
| 2,576,156 | 11/1951 | Trofimov | 192/58 C |
| 2,684,743 | 7/1954 | Trofimov | 192/58 C X |
| 3,071,225 | 1/1963 | Blau et al. | 192/58 C |
| 4,049,100 | 9/1977 | Davis | 192/58 C |
| 4,405,039 | 9/1983 | Hauser | 192/58 B |
| 4,736,828 | 4/1988 | Diessner | 192/70.14 X |

FOREIGN PATENT DOCUMENTS

| 3721623 | 1/1988 | Fed. Rep. of Germany . | |
|---|---|---|---|
| 3627504 | 2/1988 | Fed. Rep. of Germany . | |
| 0127129 | 8/1982 | Japan | 192/58 B |
| 0098033 | 5/1987 | Japan | 192/58 B |

Primary Examiner—Rodney H. Bonck
Attorney, Agent, or Firm—Marmorek, Guttman & Rubenstein

[57] ABSTRACT

A blade for liquid friction couplings consists of a disk formed with slot- or holelike apertures. In order to ensure that the blades will have a long service like whereas the occurrence of mixed friction (hump) will not adversely be affected, at least portions of the boundary surfaces of the apertures extend at an oblique angle to the surface of the disk.

11 Claims, 1 Drawing Sheet

BLADE FOR LIQUID FRICTION COUPLINGS

BACKGROUND OF THE INVENTION

1. Field of the Invention

This invention relates to a blade for liquid friction couplings, which blade consists of a disk formed with slot- or holelike apertures.

2. Description of the Prior Art

Apertures formed in the blades of liquid friction couplings will increase the torque which can be transmitted by the coupling. Said apertures consist in most cases of slots which are open at the rim of the disk. Published German Application No. 37 21 623 discloses such a disk in which the apertures have smooth longitudinal edges and the boundary surfaces of the apertures extend in planes which are normal to the surfaces of the disk. In accordance with Published German Application No. 36 27 504 the disks are formed with thicker portions at the longitudinal edges of the slot in order to promote the occurrence of mixed friction (liquid-solid friction) in the liquid friction coupling. By such thicker portions and by burrs formed during the punching or milling operations by which the apertures have been made the film that has been formed by the viscous liquid contained in the coupling is to be scraped from the adjacent blade so that the desired operating condition of mixed friction can be more easily achieved. On the other hand, said protruding thicker portions and burrs will apply a higher pressure per unit of area on the adjacent blade so that the blades will be more easily worn. If the blades are not provided with such protruding portions, the mixed friction will be less effective and the cooperation of the adjacent blades will be adversely affected so that only few blades will actually be available for a transmission of torque and those blades will be excessively loaded and be subjected to a relatively high wear.

SUMMARY OF THE INVENTION

It is an object of the invention to provide a blade which is of the kind described first hereinbefore and which will ensure a proper operating condition of the coupling and distinguishes by having a praticularly long service life.

That object is accomplished in accordance with the invention in that the boundary surfaces of the apertures extend at least in part at an oblique angle to the side faces of the disk. During a relative movement between the blade and the viscous liquid that oblique orientation of the boundary surfaces will result in an exertion of axial forces, which will greatly improve the cooperation of and contact between adjacent blades. As a result, all blades will contribute to the transmission of torque and the loads which are due to the transmission of torque will uniformly be distributed to all blades. Because the blades properly contact each other although they have no protruding parts, the desired effect of mixed friction, the so-called hump, will be improved and the load on the individual blades will be reduced. Because the load on the blade is reduced and the blade has a smooth surface, it will be virtually free of wear and will have a very long service life. Whereas the oblique boundary surfaces desirably extend throughout the length of the slots or of the edges of the holes, advantages will also be afforded by boundary surfaces which are oblique, e.g., only on one longitudinal side of the apertures or only along sections of the edges.

Experiments have shown that the result produced by the oblique boundary surfaces will increase as the inclination increases. In the previous practice and in view of the manufacturing technologies and strength properties which are available it has been found that the boundary surfaces are suitably inclined at an angle of about 6 to 9 degrees from a normal on the side face of the disk.

In a particularly desirable embodiment of the invention, burrs which have been formed during the manufacture adjacent to the acute-angled edges of the boundary surfaces have been inturned toward the apertures. As the apertures are punched or milled, more or less high burrs will be formed along the edges of the apertures on one side of the disk. Said burrs may be utilized to enhance the result produced by the oblique boundary surfaces if such burrs are inturned by roll-forming so that the burrs protrude into the apertures. As such inturned burrs will not protrude from the plane of the disk, the burrs will not be worn and may so be matched to the inclination of the oblique boundary surfaces that an optimum axial force action will be obtained.

It is desirable to directly influence also the hump or mixed friction effect without adversely affecting the resistance to wear. To that end the boundary surfaces in accordance with the invention have been machined to a rough finish and preferably have a peak-to-valley height of 5 to 15 $\mu$m. It has surprisingly been found that such surface roughness which has intentionally be produced, e.g., by a rough grinding of the boundary surfaces, will promote the separation of the viscous liquid from the adjacent blade so that the occurrance of mixed friction will be promoted.

DETAILED DESCRIPTION OF THE PREFERRED EMBODIMENT

Figure 1:
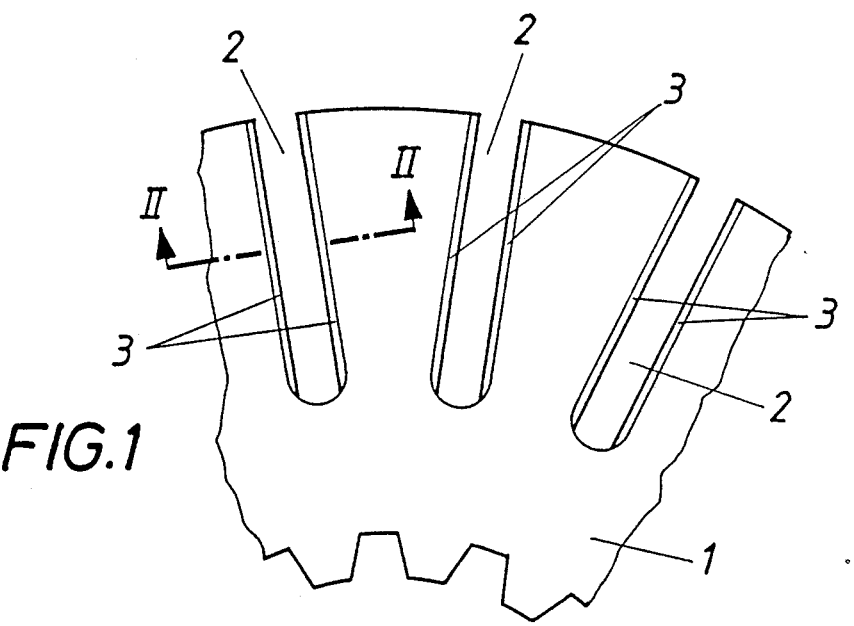
FIG. 1 is a fragmentary end elevation showing a portion of a blade in accordance with the invention.
Figure 2:
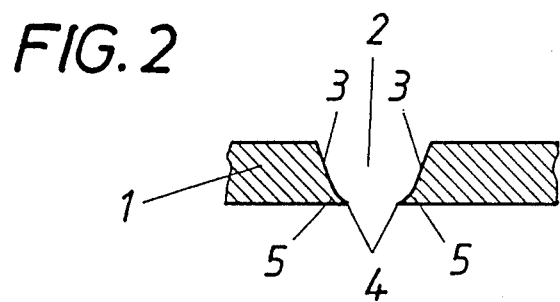
FIG. 2 is an enlarged transverse sectional view taken on line II—II in FIG. 1.

An illustrative embodiment of the invention will now be described more in detail with reference to the diagrammatic drawing.

An inner blade 1 of a liquid friction coupling is intended to be non-rotatably mounted together with a plurality of identical blades on the coupling shaft, which is rotatably mounted in a housing, which is filled with a viscous liquid. The inner blades cooperate with outer blades, which are non-rotatably connected to the housing and interdigitate with the inner blades. The inner blade 1 consists of a disk, which has apertures consisting of radially extending slots 2, which are open at the outer rim of the disk and serve to increase the torque which can be transmitted by the blade. The slots 2 are defined by boundary surfaces 3, which extend at an oblique angle to the side faces of the disk so that the slots 2 are trapezoidal in cross-section. Burrs 4 formed as a result of the manufacturing technology at the acute-angled edge portions 5 of the slots 2 have been inturned toward the slot, e.g., in that the surface of the disk has been roll-formed.

Owing to the inclination of the boundary surfaces 3 from the side faces of the disk, the blades will be subjected to an axial load so that the cooperation between adjacent inner and outer blades will be promoted. In order to promote in a simple manner also the hump, i.e., the effect of mixed friction, the boundary surfaces 3 may have a certain surface roughness, e.g., because they have been roughground, so that the formation of a film of liquid on the surface of the blades will be opposed.

I claim:

1. A liquid friction coupling blade, comprising
a disk having first and second mutually opposite side faces,
a peripheral rim for said disk, and
a plurality of apertures in said disk, each of said apertures having a boundary surface extending in an uninterrupted manner through said disk from said first side face to said second side face, said boundary surface extending from said first side face to said second side face at an angle which is at all times oblique to a normal of said disk,
wherein said first and second side faces are planar and free of axial projections.

2. THe blade of claim 1 wherein said apertures are holes.

3. The blade of claim 1 wherein said apertures are slots which open at said rim.

4. The blade of claim 1 wherein said first and second side faces are smooth and extend in parallel planes.

5. The blade of claim 1 wherein at least a portion of said boundary surface is inclined at an angle of about 6 to 9 degrees from said normal.

6. The blade of claim 1 further comprising acuteangled edge portions located where said boundary surface meets one of said first and second side faces.

7. The blade of claim 6 wherein said acute-angled edge portions comprise inturned burns.

8. The blade of claim 1 wherein said boundary surface has a rough finish.

9. The blade of claim 8 wherein said rough finish or said boundary surfaces has a peak-to-valley height of about 5 to 15 microns.

10. The blade of claim 1 wherein each of said apertures comprises two mutually opposite, generally radially extending boundary surfaces, said boundary surfaces being inclined in mutually opposite senses relative to said first and second side faces.

11. The blade of claim 1 wherein said angle varies as said boundary surface extends from said first side face to said second side face.

* * * * *